(12) United States Patent
Guetersloh

(10) Patent No.: US 8,888,119 B2
(45) Date of Patent: Nov. 18, 2014

(54) WHEEL PROTECTOR SKID FOR TRAILERS

(76) Inventor: Charles Guetersloh, Murphysboro, IL (US)

( * ) Notice: Subject to any disclaimer, the term of this patent is extended or adjusted under 35 U.S.C. 154(b) by 0 days.

(21) Appl. No.: 13/458,688

(22) Filed: Apr. 27, 2012

(65) Prior Publication Data
US 2012/0274055 A1    Nov. 1, 2012

Related U.S. Application Data

(60) Provisional application No. 61/479,890, filed on Apr. 28, 2011.

(51) Int. Cl.
 *B60P 3/10*    (2006.01)
(52) U.S. Cl.
 CPC *B60P 3/1033* (2013.01); *B60P 3/10* (2013.01)
 USPC ........ 280/414.1; 280/762; 280/770; 280/5.24
(58) Field of Classification Search
 CPC .......... B62D 39/00; B62D 63/00; B60P 3/10; B60P 3/1033
 USPC ............. 280/414.1, 762, 770, 5.2, 5.24, 5.32, 280/781; 267/7, 36.1, 37.1; 114/344
 See application file for complete search history.

(56) References Cited

U.S. PATENT DOCUMENTS

| | | | | |
|---|---|---|---|---|
| 1,360,720 A | * | 11/1920 | Brown et al. | 52/838 |
| 1,712,485 A | * | 5/1929 | Tokita | 280/5.24 |
| 2,392,674 A | * | 1/1946 | Lachman et al. | 52/837 |
| 2,519,113 A | * | 8/1950 | Cohn | 280/659 |
| 2,968,413 A |   | 1/1961 | Heckman | |
| 3,013,805 A |   | 12/1961 | Weigel | |
| 3,694,990 A | * | 10/1972 | Pamer | 52/839 |
| 3,794,130 A | * | 2/1974 | Malmgren et al. | 177/137 |
| 3,883,159 A |   | 5/1975 | Whitley, Jr. | |
| 4,046,391 A | * | 9/1977 | Restad et al. | 280/5.24 |
| 4,129,974 A | * | 12/1978 | Ojalvo | 52/837 |
| 4,133,577 A |   | 1/1979 | Pilant | |
| 4,147,379 A | * | 4/1979 | Winslow | 280/781 |
| 4,385,476 A | * | 5/1983 | Slager | 52/846 |
| 4,434,995 A | * | 3/1984 | Toy | 280/414.1 |
| 5,269,544 A | * | 12/1993 | Park | 280/5.24 |
| 5,806,871 A | * | 9/1998 | Eggleston | 280/414.1 |
| 6,634,153 B1 | * | 10/2003 | Peterson | 52/695 |
| 6,641,160 B1 | * | 11/2003 | Veal | 280/414.1 |
| 7,677,587 B2 | * | 3/2010 | Fisk et al. | 280/443 |
| 2005/0051991 A1 | * | 3/2005 | Saxon et al. | 280/149.2 |
| 2005/0179231 A1 | * | 8/2005 | Roberts, Jr. | 280/414.1 |
| 2007/0187924 A1 | * | 8/2007 | Warren | 280/414.1 |
| 2008/0122197 A1 | * | 5/2008 | Spence | 280/400 |
| 2009/0127839 A1 | * | 5/2009 | Long | 280/757 |

FOREIGN PATENT DOCUMENTS

| | | |
|---|---|---|
| AU | 200197073 A | 12/2001 |
| AU | 2008234962 A1 | 5/2010 |
| JP | 2004034869 A | 2/2004 |

* cited by examiner

*Primary Examiner* — J. Allen Shriver, II
*Assistant Examiner* — Steve Clemmons
(74) *Attorney, Agent, or Firm* — Julie A. Tennyson

(57) ABSTRACT

The device sometimes called a boat ramp buddy is a generally triangular device that attaches to a trailer frame. The device is used to help the trailer skid across uneven or washed out boat ramps or uneven ground so as not to damage the trailer itself or remove its wheels.

5 Claims, 11 Drawing Sheets

WHEEL PROTECTOR SKID FOR TRAILERS

CROSS REFERENCE TO RELATED APPLICATIONS

This application claims the benefit of U.S. Provisional Application Ser. No. 61/479,890 filed by Guetersloh on Apr. 28, 2010 and entitled "Boat Ramp Buddy", which is incorporated herein by reference.

FIELD OF INVENTION

The invention relates to equipment used on a trailer that can be used for a boat or a trailer that is used to haul items including but not limited to construction materials, household items, other vehicles and other items.

BACKGROUND OF THE INVENTION

Boats are hauled to a body of water such as a lake or river on a trailer pulled by a truck or car. Then they are backed down a ramp into the water. The ramps can be made of asphalt, concrete, or various consistencies of soil, rock, or sand. The boat and the trailer have to go into the water before the boat can be removed. Thus, the bottom end of the ramp is exposed to water and currents in the water. Over time, the boat ramp can erode. Because it is underwater, it is not visible to the person putting their boat into the water or taking it out. When getting a trailer out of the water, the wheels will often get stuck on an eroded ramp. While attempting to get the trailer out of the water, the owner will exert force on the boat trailer causing the axle to be damaged or removed from the trailer. Additionally, other parts of trailer and boat could be damaged. Trailers used on land exclusively also have the problem of getting stuck on uneven ground.

SUMMARY OF THE INVENTION

The present invention is a generally triangular device that can be made of any material that is strong enough to withstand the force of a trailer moving across a ramp. Examples of materials can be polymers, high density plastics, iron, steel, and aluminum. The device is attached to the bottom of the frame just in front of the wheels on both sides of the frame.

DETAILED DESCRIPTION OF THE INVENTION

The device 100, 300 sometimes called a boat ramp buddy is a generally triangular device that attaches to a trailer frame 210. The device 100, 300 is used to help the trailer 200 skid across uneven or washed out boat ramps or uneven ground. The material of the device 100, 300 is strong enough to withstand skidding across the boat ramp or uneven ground. This device 100, 300 protects the trailer wheels 220 and axle from being torn from the trailer frame.

Figure 1:
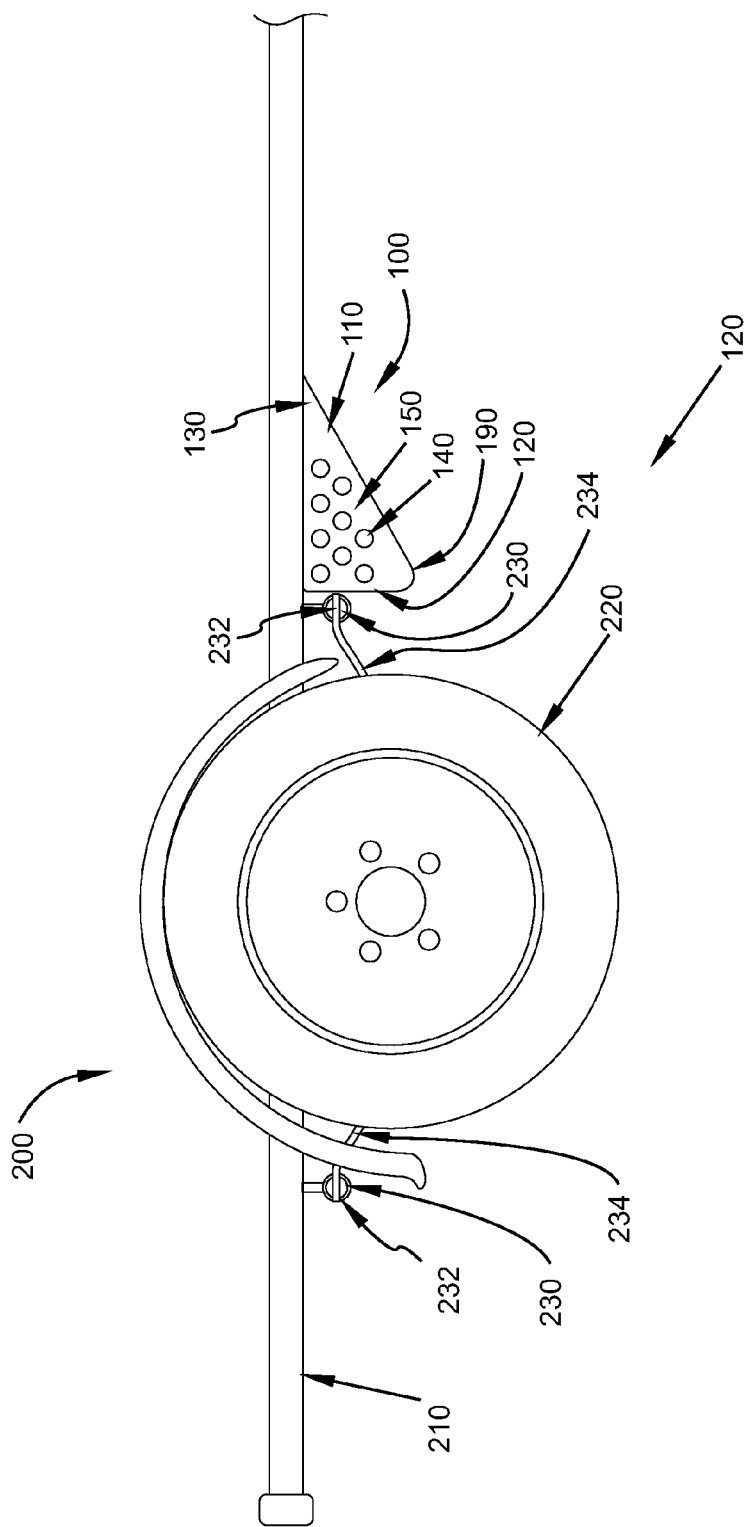
FIG. 1 is a side view of a trailer with the device attached
Figure 2:
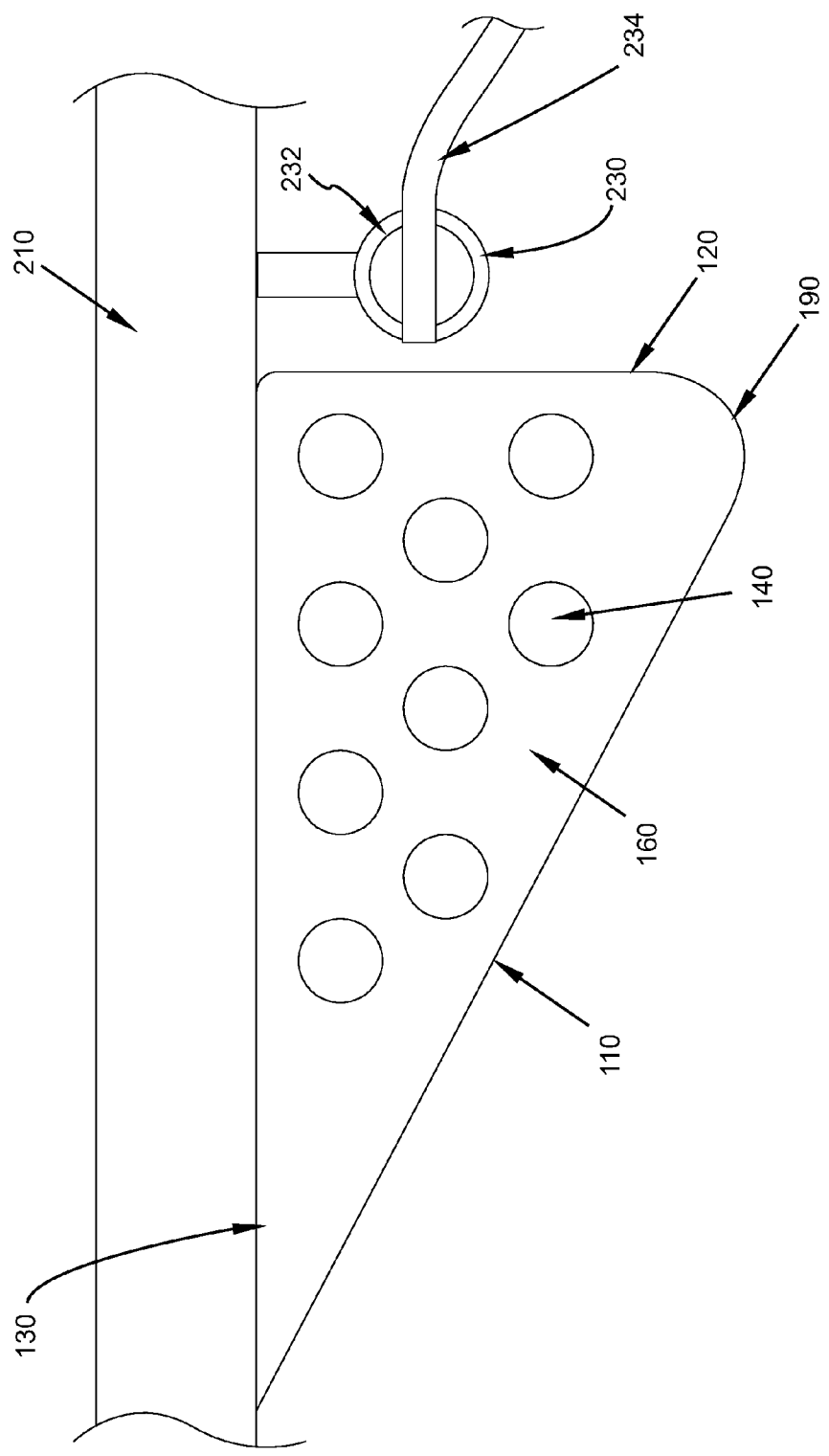
FIG. 2 is a close-up side view of the device attached to a trailer.
Figure 3:
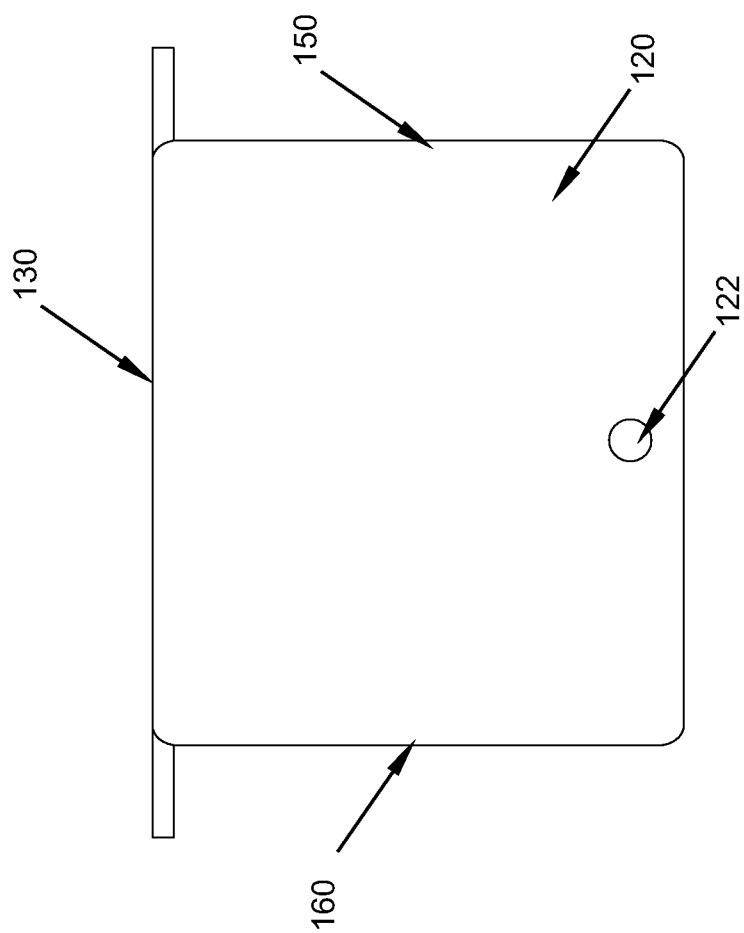
FIG. 3 is a rear view of the device.
Figure 4:
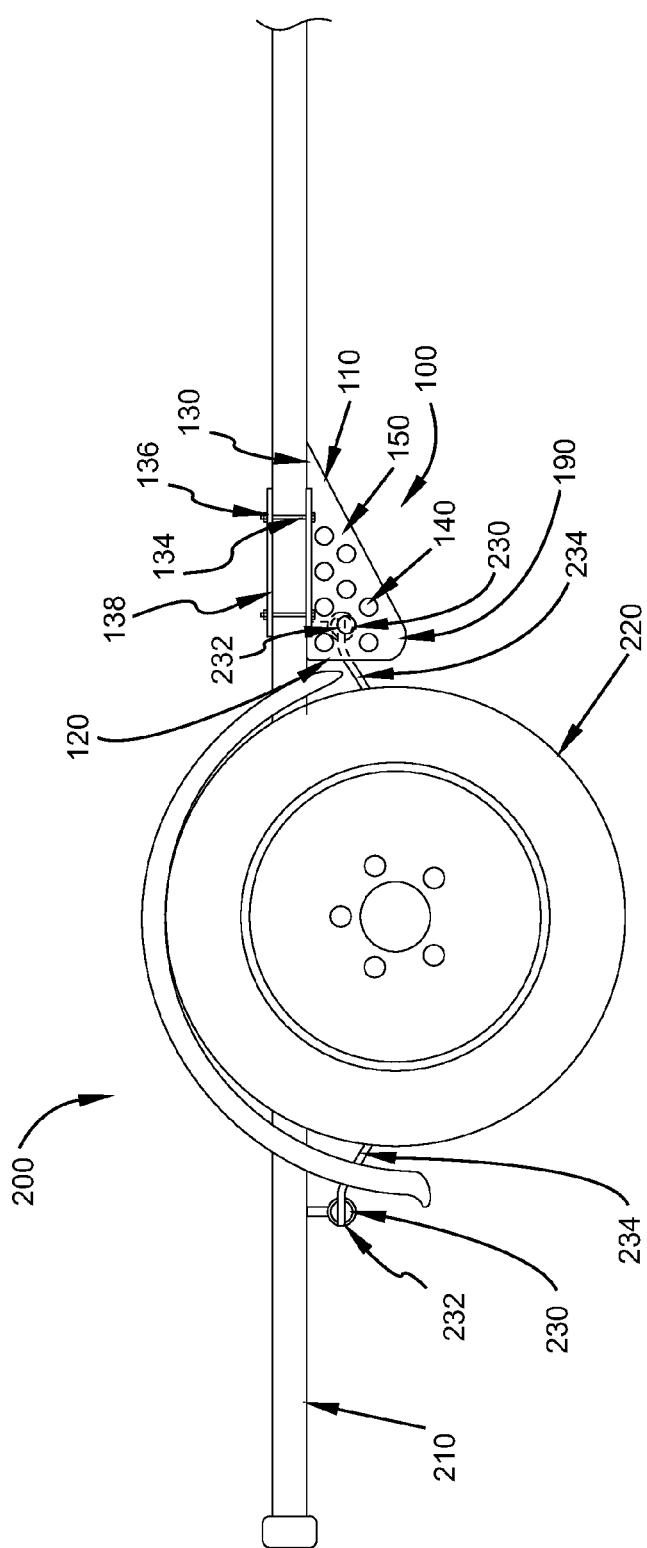
FIG. 4 is a side view of the trailer and the device bolted onto the trailer.
Figure 5:
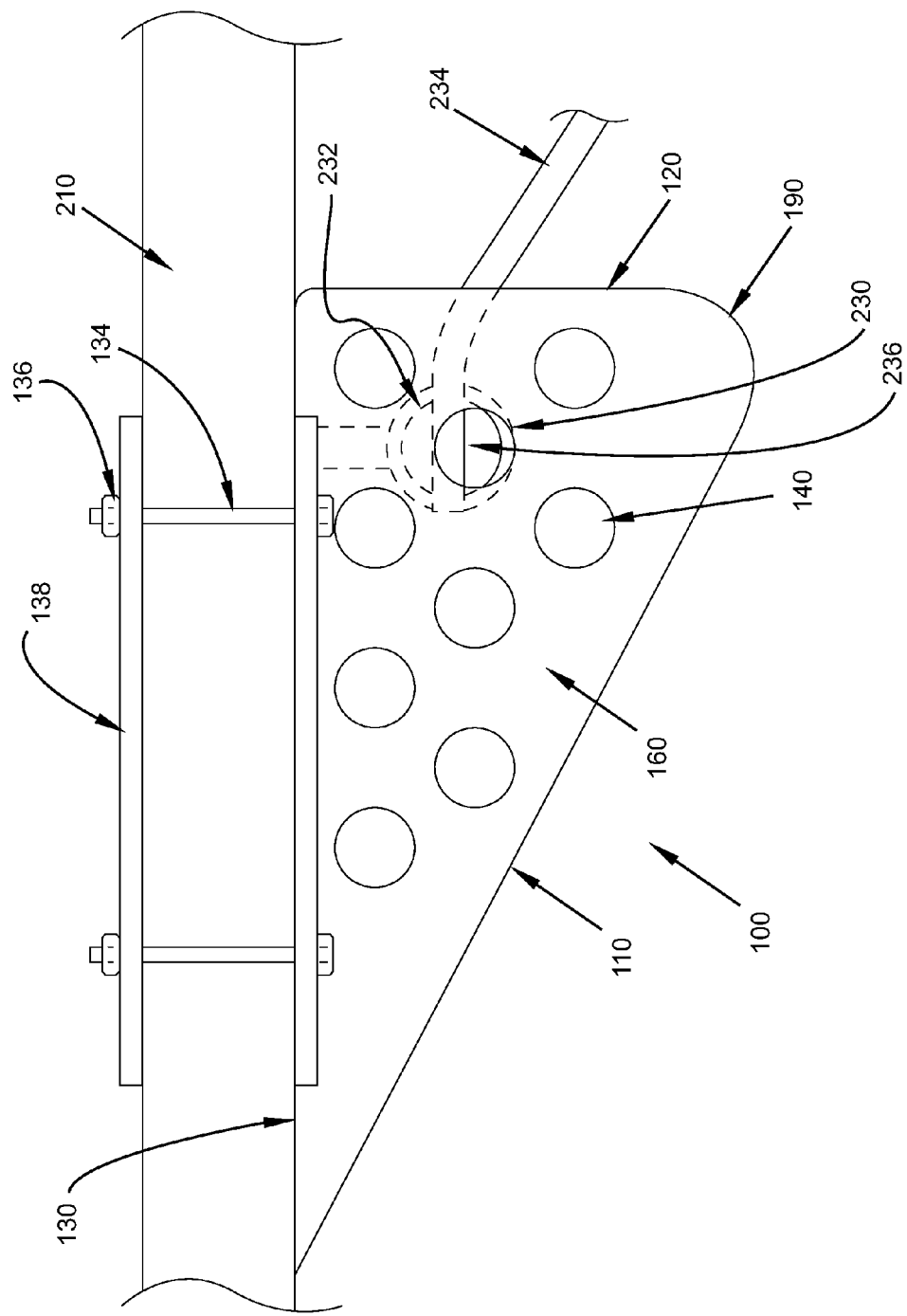
FIG. 5 is a close-up side view of the device bolted on the trailer.
Figure 6:
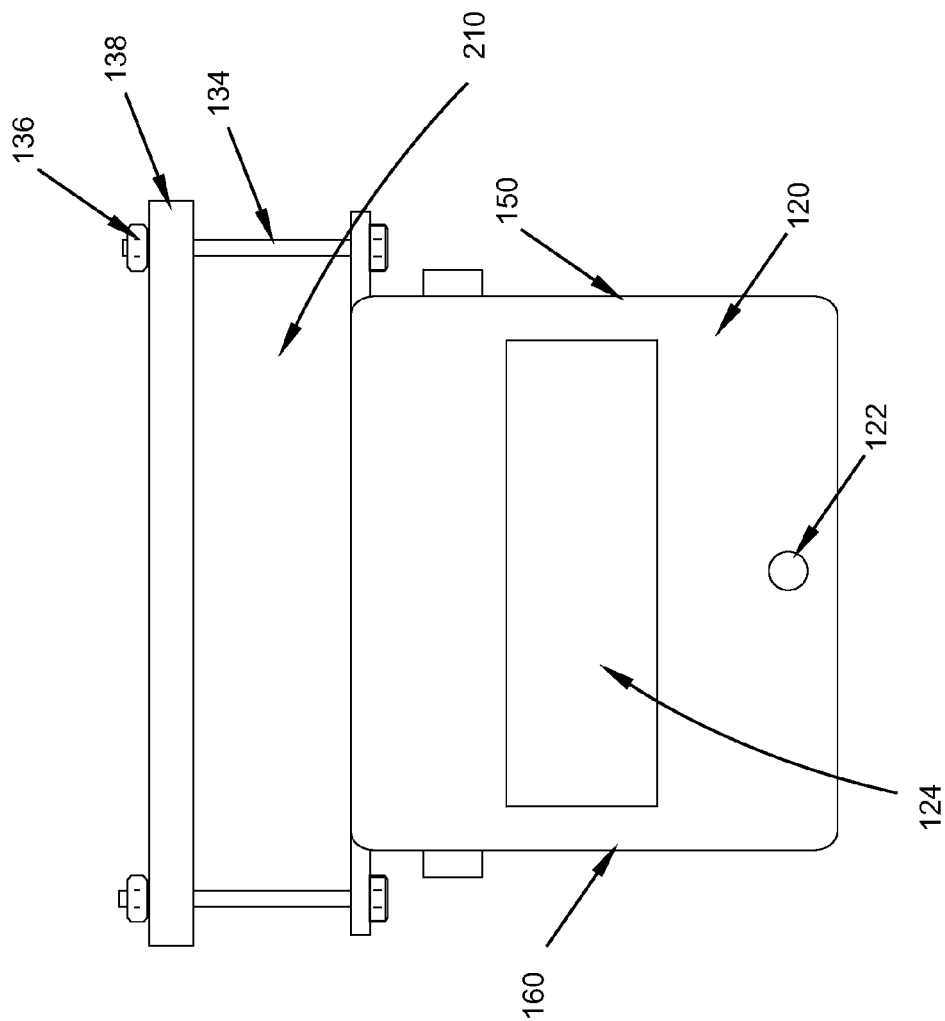
FIG. 6 is a rear view of the device bolted on the trailer.
Figure 7:
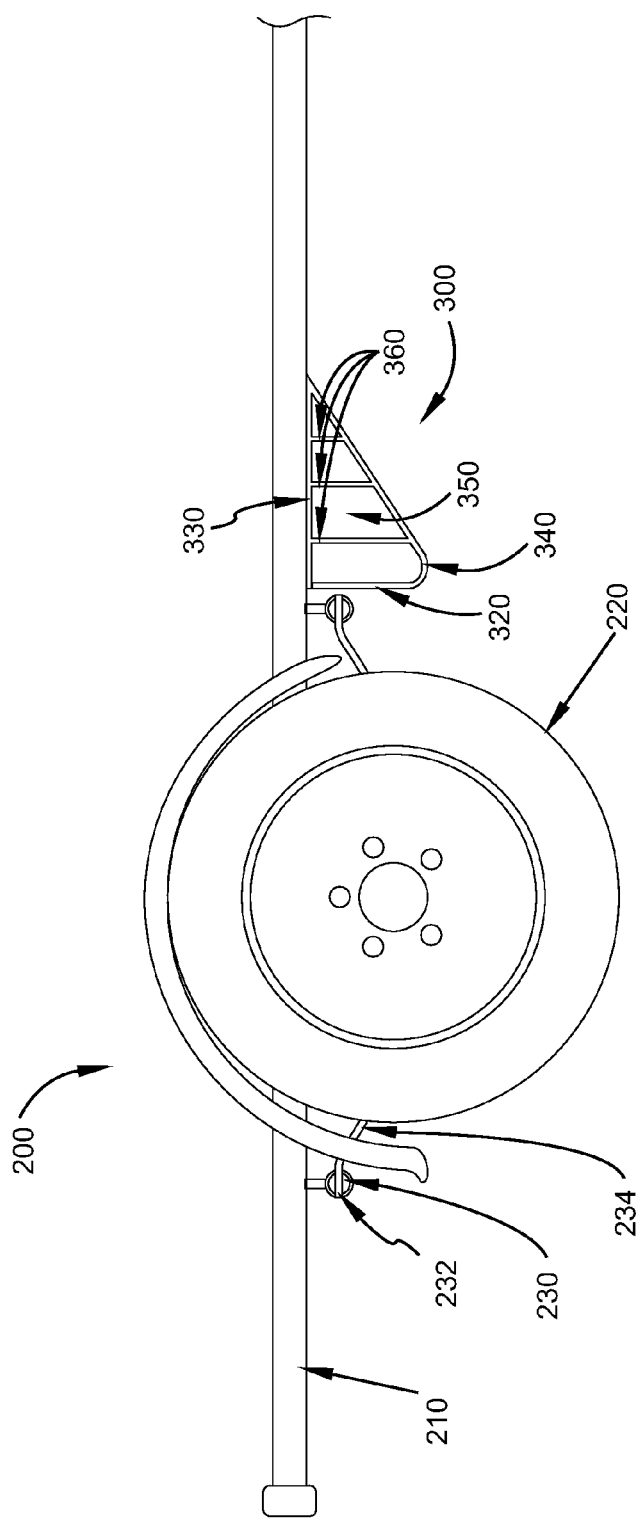
FIG. 7 is a side vide of the device attached to the trailer.
Figure 8:
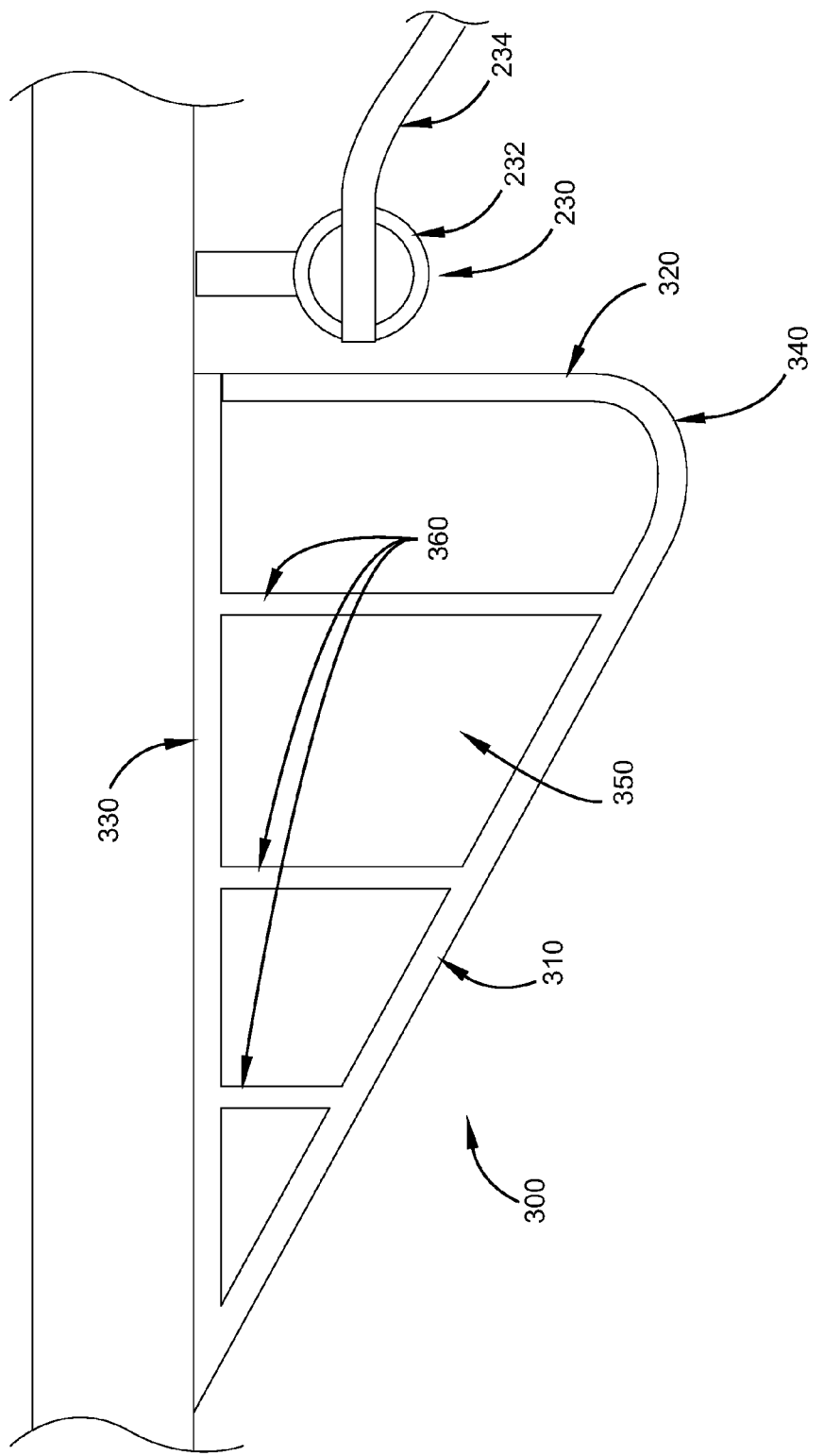
FIG. 8 is a close-up side view of the device attached to the trailer.
Figure 9:
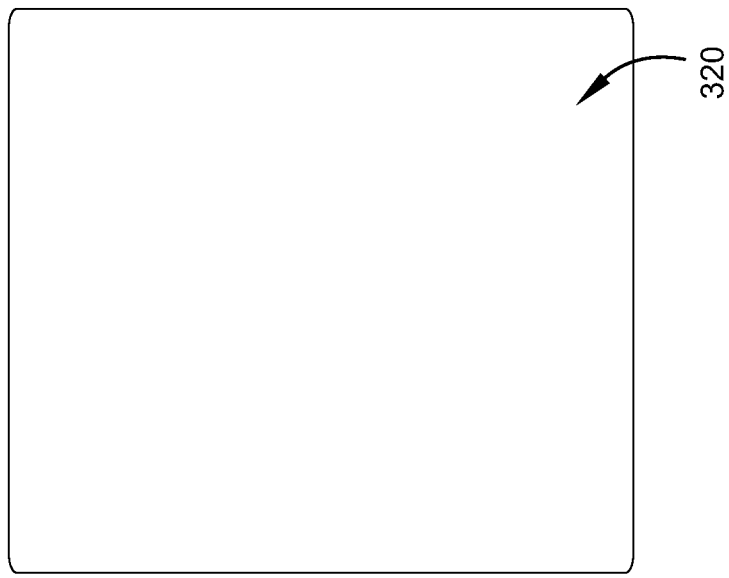
FIG. 9 is a rear view of the device.
Figure 10:
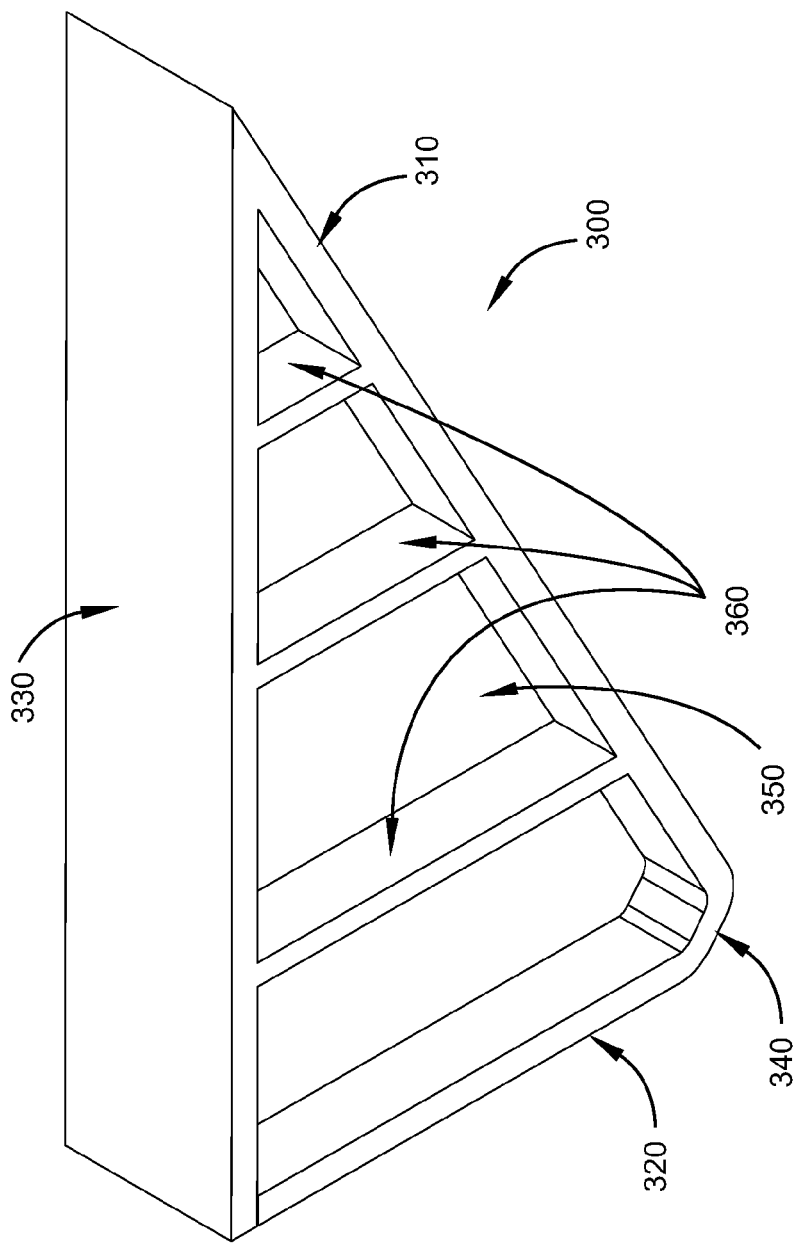
FIG. 10 is an orthogonal view of the device.
Figure 11:
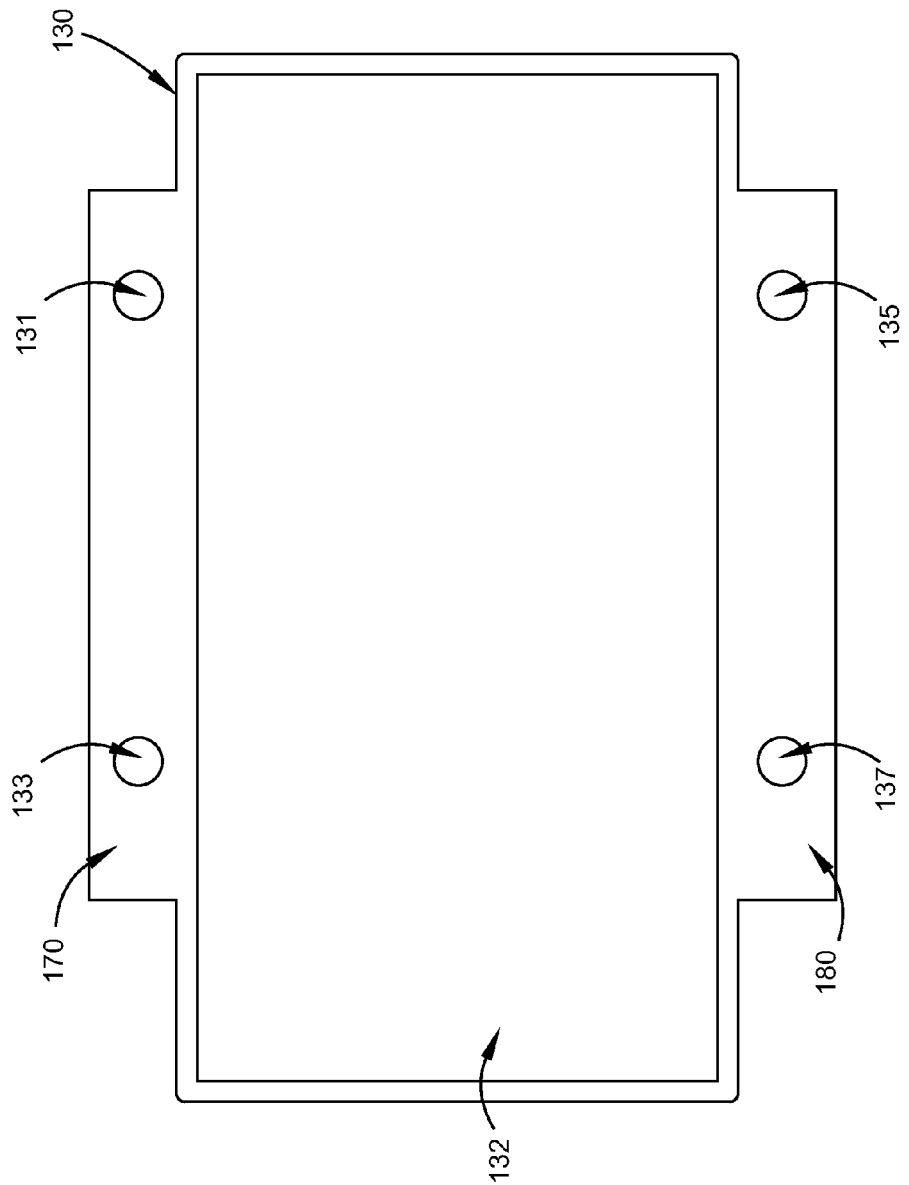
FIG. 11 is a top view of the device.

In one embodiment of the device as in FIGS. 1-6, the device 100 has a first lateral side 150 and a second lateral side 160 that are connected on three sides: a back perimeter side 120, a bottom perimeter side 110 and a top perimeter side 130. The top perimeter side 130 is the connection point for the trailer frame 210. The top perimeter side 130 is generally parallel to the trailer frame. The top perimeter side 130 in FIG. 11 when it has an top perimeter side opening 132 it will also have a first and second lateral flanges 170, 180 with four bolt holes: A first bolt hole 131 near the point where the top perimeter side 130, the bottom perimeter side 110 and the first lateral side 150 meet, a second bolt hole 133 near the point where the top perimeter side 130, the back perimeter side 120 and the first lateral side 150 meet, a third bolt hole 135 near the point where the top perimeter side 130, the bottom perimeter side 110 and the second lateral side 160 meet, and a fourth bolt hole 137 near the point where the top perimeter side 130, the back perimeter side 120 and the second lateral side 160 meet. The first and second lateral flanges 170, 180 extend from the top perimeter side 130 in a perpendicular fashion to the first and second lateral sides 150, 160.

Above the frame 210 can be a friction plate 138. The purpose of the friction plate 138 is to have four bolt holes that match up with the four bolt holes 131, 133, 135, and 137 on the top perimeter side. A bolt 134 will be inserted through those bolt holes and the friction plate 138 will prevent forward and backward movement of the device 100. The bolts 134 are held on by nuts 136. The friction plate 138 is also made of a hard material, which could be steel, iron, high density plastics, polymers, or aluminum.

The first and second lateral sides 150, 160 can include one or more holes 140 as long as the lateral sides 150, 160 are strong enough to withstand the force of the trailer frame 210 skidding across the ramp. But the first and second lateral side 150, 160 can be without holes 140. The first and second lateral sides 150, 160 are as thin as possible but still allow for strength to not bend when used on uneven ground.

The back perimeter side 120 can include a spring shackle opening 124 to allow the spring shackle 230 to go through to the bottom of the trailer frame. The spring shackle 230 has two parts a spring 234 and an attachment assembly 232. The spring shackle may have an optional spring bolt 236 through a hole 140 to help hold the spring 234 in place. Also below the spring shackle opening 124 is a drain hole 122. The purpose of the drain hole 122 is to allow any water that accumulates to drain out. When the trailer 200 is put in the water, water can get inside the device 100.

The back perimeter side 120 and a bottom perimeter side 110 are joined at round junction 190. The round junction 190, 340 can be more rounded than shown in the figures so that the device 100, 300 can facilitate the trailer going backward or forward over dropoffs or step-ups in the water or on land.

The device 100 could be welded onto the frame instead of bolted or it could be attached in a number of different ways.

The second embodiment of the device 300 in FIGS. 7-10 is a top member 330, a bottom member 310, a central member 350 and a back member 320 connected together in a generally triangular shape. The bottom member 310 and the back member 320 are brought together in a circular shape. The central member 350 meets the back member 320, the bottom member 310 and the top member 330 in a perpendicular fashion to form what looks like an I-beam. The central member 350 can have one or more reinforcement strips 360 that have a length greater than the width. One end of the reinforcement strip 360 is attached to the top member 330 on one side of the central member 350 and on the second end to the bottom member 310. The reinforcement strips 360 can be omitted if the material is sufficiently strong that it does not require reinforcement.

What is claimed is:

1. A generally triangular device comprising: a central member, a back member, a bottom member, and a top member where the central member is perpendicular and divides in approximately half the back member, bottom member and the top member, and one end of the top member is connected to one end of the bottom member and the other end of the top member is connected to one end of the back member, and the other end of the back member is connected to the other end of the bottom member and the top member is connected to a boat trailer in front of the axle and spring shackle.

2. The device in claim 1 where the device is connected by welding the top member to the boat trailer frame.

3. The device in claim 1 where the device has one or more reinforcement strips with a length greater than width attached to the top member, on one side to the central member, and to the bottom member.

4. The device in claim 1 where the top member has a first bolt hole besides the point where the top member, the bottom member, and the central member meet on the first side of the central member; a second bolt hole besides the point where the top member, the bottom member, and the central member meet on the second side of the member; a third bolt hole besides the point where the top member, the back member, and the central member meet on the second side of the central member; and a fourth bolt hole besides thed point where the top member. the back member, and the central member meet on the second side of the central member.

5. The device in claim 1 where a friction plate is above the boat trailer frame and attached by a series of bolts in the first through fourth bolt holes.

* * * * *